May 9, 1961

H. C. HARBERS ET AL 2,983,548

TAIL GATE LATCH-OPERATING MECHANISM FOR TILTING DUMPING VEHICLES

Filed May 13, 1957

Henry C. Harbers,
Donald R. Merchant,
INVENTORS.

BY

Attorney

May 9, 1961 H. C. HARBERS ET AL 2,983,548
TAIL GATE LATCH-OPERATING MECHANISM FOR
TILTING DUMPING VEHICLES
Filed May 13, 1957 2 Sheets-Sheet 2
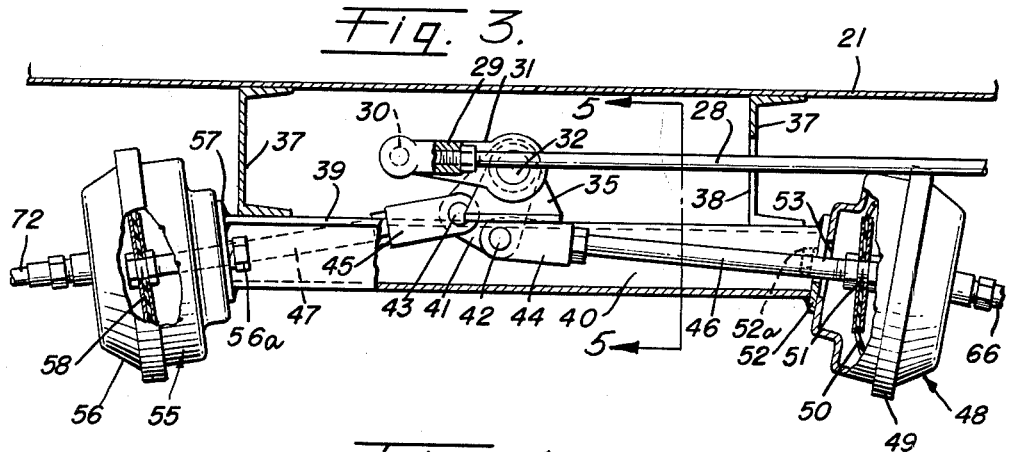
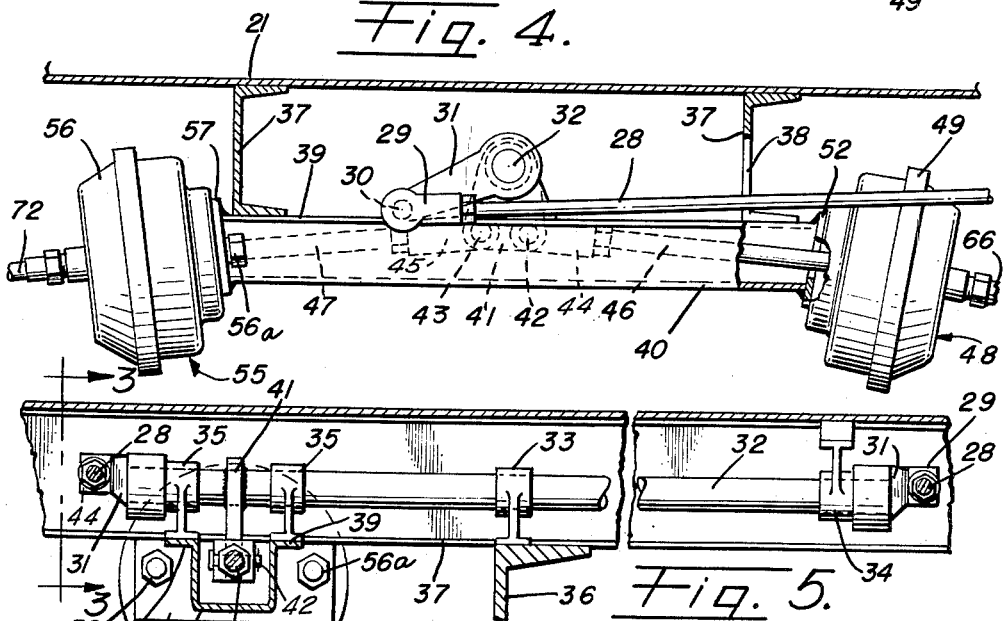
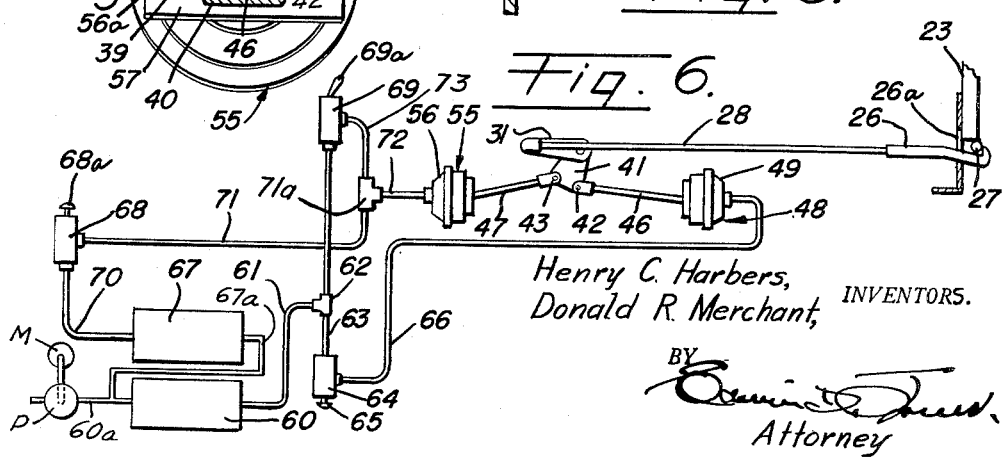
Henry C. Harbers,
Donald R. Merchant, INVENTORS.
BY
Attorney United States Patent Office 2,983,548
Patented May 9, 1961

2,983,548

TAIL GATE LATCH-OPERATING MECHANISM FOR TILTING DUMPING VEHICLES

Henry C. Harbers, Pasadena, and Donald R. Merchant, Glendale, Calif., assignors, by mesne assignments, to Challenge-Cook Bros., Incorporated, Los Angeles, Calif., a corporation of California Filed May 13, 1957, Ser. No. 658,784

7 Claims. (Cl. 298—23)

Our invention relates to tail gates as used on dump bodies of dump trucks, semi-dump trailers and the like, and more particularly to mechanisms for operating the latches for the tail gates to latch or release the gates.

It is a purpose of our invention to provide a tail gate latch-operating mechanism for a dump body which is actuatable to latch or unlatch the tail gate according as the dump body occupies load-carrying position or load-dumping position.

It is also a purpose of our invention to provide a tail gate latch-operating mechanism which embodies compressed air or other fluid pressure operated means for moving the latch to latch or release the tail gate, and valves for controlling operation of said means, one valve being manually operable to effect release of the tail gate so that it can open as the dump body is tilted to dumping position from its normal horizontal load-carrying position, and the other valve operable automatically under return movement of the dump body to horizontal load-carrying position following dumping of its load, to effect relatching of the tail gate in closed position.

A further purpose of our invention is the provision of a tail gate latch-operating mechanism, embodying means for maintaining the tail gate latched in closed position even though there may be a complete loss of air or other fluid pressure.

We will describe only one form of tail gate latch-operating mechanism for dump bodies attached to one form of dump body, and will then point out the novel features thereof in claims.

In the accompanying drawings:

Fig. 3 is a vertical sectional view taken on the line 3—3 of Fig. 5 and showing the parts of the mechanism in the same positions as shown in Fig. 1.

Fig. 4 is a view similar to Fig. 3 and showing the parts of the mechanism in the same position as shown in Fig. 2.

Fig. 5 is a sectional view taken on the line 5—5 of Fig. 3.

Fig. 6 is a view showing schematically the latch-operating mechanism and the pneumatic system for actuating the same.

Figure 1:
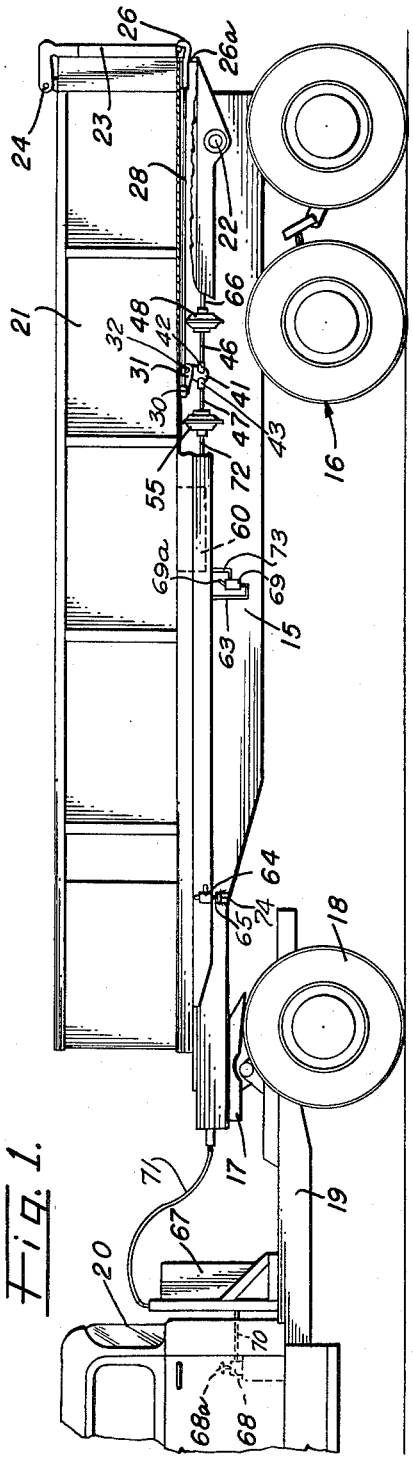
Fig. 1 is a view showing in side elevation a truck and a semi-trailer combination, with a dump body on the semi-trailer occupying horizontal or load-carrying position, and having applied thereto one form of tail gate latch-operating mechanism embodying our invention.
Figure 2:
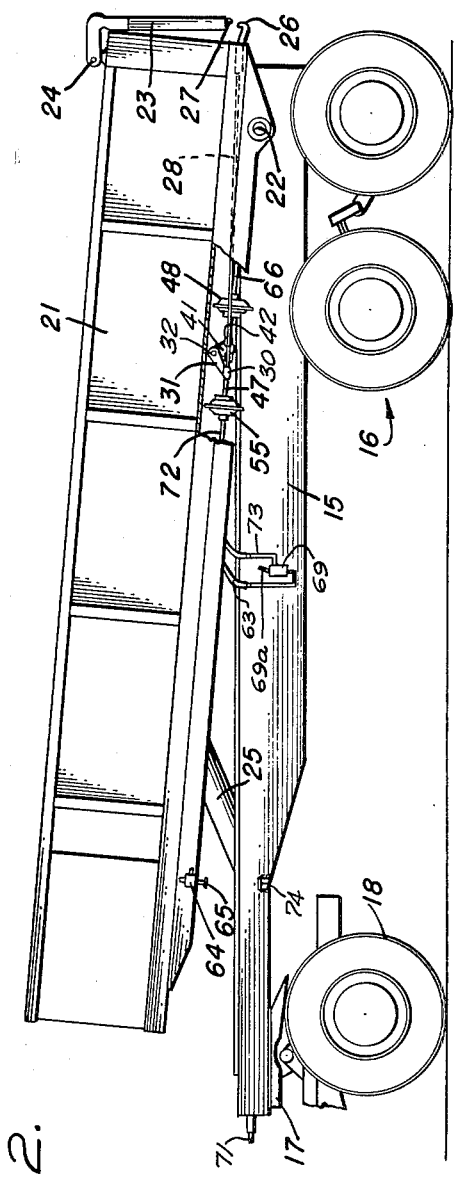
Fig. 2 is a view similar to Fig. 1 showing the dump body in tilted position.

Referring more particularly to the drawings, in Figs. 1 and 2 is shown one type of dump truck with which my mechanism may be attached, and in the present instance it comprises a semi-trailer frame 15 supported at its rear end by a rear wheel assembly 16, and supported at its front end by a fifth wheel 17 which is in turn supported on a front wheel assembly 18. This assembly 18 constitutes the rear wheels of a truck frame 19, upon which is supported a cab 20. It will be understood that the truck frame 19 carries a motor (not shown) which serves to propel the truck and thus tow the semi-trailer.

A dump body 21 is pivoted, as at 22, on the rear end of the trailer frame 15 where the dump body occupies a substantially horizontal or load-carrying position as shown in Fig. 1, or a tilted or load-dumping position as shown in Fig. 2, it being understood, however, that the dump body is adapted to be tilted to a greater angle than that shown to effect complete dumping of its contents from the rear end thereof as controlled by a tail gate 23 pivoted, as at 24, on the dump body so as to swing to an open position under upward tilting movement of the dump body.

Any mechanism may be employed to swing the dump body 21 upwardly and rearwardly about the pivot 22 to occupy any predetermined angular position, and to return the dump body to load-carrying position wherein its forward end rests on the trailer frame 15. In the present instance, such means is shown as a telescopic hydraulic ram 25 which is adapted to be pivoted at one end on the trailer frame 15, and at the other end to the underside of the dump body 21.

The tail gate 23 is securable in closed position by a latch which comprises two latch hooks 26 extending through horizontal slots 26a in the rear end of the dump body 21, and engageable with a keeper member 27 on the lower end of the gate. The latch hooks are secured, respectively, to the rear ends of a pair of rods 28, and the forward ends of the rods are, by conventional adjustable connections 29, pivotally connected, as at 30, to a pair of crank arms 31 fixed on the ends of a cross shaft 32.

As best shown in Fig. 5, the shaft 32 is rotatably supported in bearings 33, 34 and 35. The bearing 33 is supported on a beam 36 extending longitudinally beneath the dump body 21, and secured to a pair of transverse beams 37 fixed to the underside of the dump body. One beam 37 is provided with openings 38 through which the rods 28 extend, as best shown in Fig. 4.

The bearings 35 are fixed to and supported on flanges 39 of a U-shaped beam 40 which bridges and is fixed to the underside of the beams 37. At a point where the shaft 32 crosses the top side of the beam 40, a bell-crank lever 41 is fixed thereto. Pivoted as at 42 and 43, respectively, are adjustable connectors 44 and 45 similar in construction to the connector 29, and to these connectors are secured, respectively, the confronting ends of a pair of rods 46 and 47 which are movable lengthwise in the beam 40.

The rod 46 is actuatable by a diaphragm unit 48 which comprises a casing 49 containing a diaphragm 50 to which the respective end of the rod 46 is connected as at 51. The rod extends through an opening in a plate 52 fixed on the adjacent end of the beam 40, and a second opening 53 in the confronting side of the casing 49. The casing 49 is secured to the plate 52 by stud bolts 52a.

The rod 47 is actuatable by a diaphragm unit 55 which includes a casing 56 one side of which is secured by stud bolts 56a to a plate 57 welded to the adjacent end of the beam 40. This unit also includes a diaphragm 58 to which the adjacent end of the rod 47 is fixed, and the rod extends through suitable openings in the casing and plate to permit longitudinal movement of the rod by the diaphragm.

Air under pressure is supplied to the casings 49 and 56 for actuating the diaphragms 50 and 58 which in turn selectively actuate the rods 46 and 47 for turning the shaft 32 in one direction or the other whereby the latch rods 28 are moved in one direction or the other to move the latch hooks into or out of engagement with the keeper 27 for latching or unlatching the gate 23.

For this purpose the pneumatic system illustrated schematically in Fig. 6 is employed, and this system comprises a storage tank 60 which may be carried on the trailer frame 15 and connected to the casing 49 of the diaphragm unit 48 through a line or conduit 61 connected by a T-joint 62 to a conduit 63 which, in turn, is connected to a two-way valve 64 normally urged to closed position and having a stem 65 for moving it to open position. A third conduit 66 connects the valve 64 to the casing 49 at one side of the diaphragm 50.

A second compressed air storage tank 67, preferably supported on the frame 19, is provided in the system and from this tank, air under pressure can be supplied to the diaphragm unit 55 either under the control of a manually operated two-way valve 68 located in the cab 20 and urged to closed position but movable to open position by a stem 68a, or a second two-way valve 69 urged to open or closed position and operable by a lever 69a. This valve 69 may be located on the frame 15 at any convenient point along its length for operation from the ground. For supplying to and maintaining air under pressure in tanks 60 and 67 a pump P operated by a motor M is shown in Fig. 6, with conduits 60a and 67a connected to the pump and to the tanks in the manner shown.

Air from the tank 67 is supplied to the valve 68 by a conduit 70, and from this valve to the casing 56 of the diaphragm unit 65 through conduits 71 and 72. Also, air under pressure can be supplied to the casing 56 from the tank 60 through the conduits 61 and 73 under control of the valve 69 which is connected to the conduit 71, and the latter, in turn, connected to the conduit 72 which leads to the casing 56.

The valves 64, 68 and 69 are of the well-known type which bleed air to atmosphere when closed, and thus as used in the present system operate when closed to exhaust air from the casings 49 and 56 to atmosphere for relieving the diaphragms 50 and 58 of air pressure so that when air under pressure is supplied to one unit 48 or the other unit 55 for operation of its respective diaphragm, air from the casing of the other unit will have been exhausted to atmosphere, thus allowing free flexing of the diaphragm therein by the rod 46 or 47 according as the mechanism is actuated to move the latch to gate-latching or releasing position.

In the operation of our invention, when the dump body 21 is in the load-carrying position shown in Fig. 1, the parts of the mechanism are in the positions shown in Figs. 1 and 3 to which they have been moved by air pressure supplied to the casing 49 by opening of the valve 64. In such part positions the rods 38 have been moved forwardly to draw the latch hooks 26 into engagement with the keeper 27 thus securing the gate 23 in closed position.

It is important to note that in the aforesaid positions of the mechanism parts, the crank arms 31 are positioned to the upper side of horizontal dead center, thus preventing counter-clockwise rotation of the shaft 32 and consequent movement of the rods 38 rearwardly so that the latch hooks 26 are maintained in gate-latching position. Thus, even should air be accidentally reduced in pressure or completely exhausted from diaphragm unit 48, the latch hooks will remain in gate-latching position to prevent accidental opening of the gate.

The valve 64 is adapted to be opened to actuate the mechanism for latching the tail gate in closed position, as above described, by mounting the valve preferably adjacent the forward end of the dump body and at one side thereof so that the stem 65 is pushed upwardly by its engagement with the stop member 74 of the frame 15 as the dump body returns to horizontal position following tilting thereof to dump its load.

It will be evident that upon opening of the valve 64 air under pressure from the tank 60 will be supplied through conduits 61—63 and 66 to casing 49, thereby actuating diaphragm 50 to move rod 46, through lever 41, from the position shown in Fig. 4 to that shown in Fig. 3 whereby, the shaft 32 is rotated to move the rods 38 and thus actuate the latch hooks 26 to secure the tail gate in closed position.

Upon tilting the dump body 21 to load-dumping position through operation of the ram 25, the valve 64 closes at the beginning of tilting movement, since the stem 65 is immediately relieved of upward pressure. Closing of the valve 64 relieves the diaphragm 50 of air pressure so that it can respond to operation of the mechanism to move the latch hooks 26 free of the keeper 27 and thus permit the tail gate to open. Such operation of the mechanism is controlled manually through opening of the valve 68 or 69.

Upon opening of the valve 68, which as described is located in the cab 20, air under pressure from the tank 67 is supplied to the casing 56 of the diaphragm unit 55 to so actuate the diaphragm 58 as to move the rod 47 from the position shown in Fig. 3 to that shown in Fig. 4 whereby, the lever 41 is operated to rotate the shaft 32 counter-clockwise, and thus rotate the crank arms 31 to so move the rods 38 as to cause the latch hooks 26 to disengage the keeper 27 and unlatch the tail gate.

It will be evident from Fig. 6 that upon opening of the valve 68, air under pressure is supplied to the casing 56 from the tank 67 through conduit 70, valve 68, conduit 71, check valve 71a and conduit 72. Also, it will be evident from Fig. 6, that the latch mechanism can be operated to release the tail gate by opening of the valve 69 since by so doing air under pressure from the tank 60 will be supplied to the casing 56 to actuate the diaphragm 58, through conduits 61, 63, 73 and 72.

Valves 65, 68 and 69 are of the type that when closed they allow air from the diaphragm units 48 and 55 to bleed to atmosphere so that the operation of such units will not interfere with each other. Also, the valve 71a is of the conventional double check shuttle type which in this use operates under the pressure of air thereto from either tank 60 or 67, to prevent air bleeding to atmosphere through closed valve 69 when valve 68 is opened, or to prevent air bleeding to atmosphere through closed valve 68 when valve 69 is opened.

From the preceding description it will be manifest that the mechanism of our invention is operable to unlatch the tail gate by opening either valves 68 or 69 only after initiating tilting movement of the dump body for dumping, and operable to unlatch the tail gate through opening of the valve 64 automatically by the dump body as it returns to horizontal position. Moreover, accidental unlatching of the tail gate cannot occur even if there is a complete loss of compressed air in the system. Additionally, our mechanism allows of prying the latch hooks out of engagement with the keeper to permit opening the gate in case of an emergency.

Although we have herein shown and described only one form of tail gate latch-operating mechanism for dump bodies embodying our invention, it is to be understood that various changes and modifications may be made therein without departing from the spirit of the invention and the spirit and scope of the appended claims.

What we claim is:

1. In combination: a vehicle having a frame; a dump body pivoted on said frame and movable between load-carrying and load-dumping positions; means on said frame for moving said body to load-dumping position, a tail gate operably mounted on said body; a latch for said gate movable between a locking position and a releasing position; mechanism carried by said body for moving said latch to lock or release said gate; two fluid-pressure-actuated units, one operatively connected to the mechanism for actuating the latter to move said latch to release said gate, and the other operatively connected to the mechanism for actuating the latter to move said latch to lock said gate; manually operable control means for that one of said units which operates the mechanism to move said latch to release said gate; and a control means for the other of said units, said control means being attached to said vehicle and so associated with said body that as the latter moves to load-carrying position the mechanism will be operated to move said latch to lock said gate.

2. In combination: a vehicle frame; a dump body pivoted on said frame to occupy load-carrying and load-dumping positions; means on said frame for moving said body to load-dumping position; a tail gate operably mounted on said body and movable between closed and open positions; a latch for said gate movable between a locking and a releasing position; manually controlled fluid-pressure operated mechanism connected to said latch for moving same to release the tail gate; a second fluid-pressure operated mechanism for moving said latch to lock said gate in closed position; and control means for said second mechanism actuated as said body moves to load-carrying position to effect operation of said second mechanism to move the latch to the locking position and lock said gate in closed position.

3. In a vehicle having a dump body with a tail gate pivotally mounted on said body and latch means for said tail gate, said dump body being pivotally movable between a substantially horizontal load-carrying position and an inclined load-dumping position; a first pneumatically operable means connected to said latch means for moving the latter to a locking position for securing the tail gate in closed position; a second pneumatically-operable means connected to said latch means for moving the latter to a released position to release said gate; a manually-operable valve connected to said second means for controlling operation thereof; and a valve connected to said first means for controlling operation thereof, said valve being connected to said vehicle and so positioned thereon as to be operable when the body is in the substantially horizontal position to effect actuation of the first means to move the latch means to latching position.

4. An operating mechanism for the tail gate latch of a dump body which is movable to occupy load-carrying and load-dumping positions, including: a rod fixed to said latch; a shaft adapted to be rotatably mounted on said body; a connection between said rod and said shaft for causing axial movement of said rod in one direction to move said latch to release said tail gate, or in the other direction to move said latch to lock said tail gate in closed position, according as the shaft is rotated in one direction or the other; a pair of diaphragm units connected to a source of air pressure, and having members so operatively connected to said shaft that according as air pressure is supplied to one of said units or the other said shaft will be rotated to move said latch to release or lock said gate; valve means for controlling the supply of air pressure from said source to that one of said units for moving said latch to release said gate; and a second valve means for supplying air pressure from said source to the other of said units to move said latch to lock said gate, said second valve means being actuated to supply said air pressure to the other of said units upon movement of said body to load-carrying position.

5. An operating mechanism for the tail gate latch of a dump body as embodied in claim 4, wherein said connection includes a crank arm so fixed circumferential to the shaft and so pivotally connected to said rod that when said latch is in gate-locking position said arm occupies a position in which its pivotal connection with said rod is to one side of a dead center line intersecting the axis of said shaft and said pivotal connection to secure said latch against accidental movement to release said gate.

6. An operating mechanism for latch for the tail gate of a dump body which is movable to occupy load-carrying and load-dumping positions, said tail gate being pivotally mounted on said dump body, including: a rod fixed to said latch; a shaft adapted to be rotatably mounted on said body; a connection between said rod and said shaft for causing axial movement of said rod in one direction to move said latch to release said tail gate, or in the other direction to move said latch to lock said tail gate in closed position, according as the shaft is rotated in one direction or the other; a pair of diaphragm units connected to a source of air pressure, and having members so operatively connected to said shaft that according as air pressure is supplied to one of said units or the other said shaft will be rotated to move said latch to release or lock said gate; said connection including a crank arm so fixed circumferential to the shaft and so pivotally connected to said rod that when said latch is in gate-locking position said arm occupies a position in which its pivotal connection with said rod is to one side of a dead center line intersecting the axis of said shaft and said pivotal connection to secure said latch against accidental movement to release said gate.

7. An operating mechanism for the tail gate latch means of a dump body which is movable to occupy load-carrying and load-dumping positions, including: a first pneumatically-operable means connected to said latch means for moving said latch means to secure the tail gate in closed position; a second pneumatically-operable means connected to said latch means for moving the latter to release said gate; a manually-operable valve connected to said second pneumatically-operable means for controlling operation thereof; and a valve connected to said first means for controlling operation thereof, said valve being so positioned with respect to the dump body as to be operable with return movement of the latter to a load-carrying position for effecting actuation of said first means to move the latching means to latching position.

References Cited in the file of this patent

UNITED STATES PATENTS

| | | |
|---|---|---|
| 1,878,220 | Willshaw et al. | Sept. 20, 1932 |
| 2,220,202 | Bohne | Nov. 5, 1940 |
| 2,237,299 | Benbow et al. | Apr. 18, 1941 |
| 2,237,838 | McClish | Apr. 8, 1941 |
| 2,299,922 | Newell | Oct. 27, 1942 |
| 2,552,442 | McClish | May 8, 1951 |
| 2,653,847 | Helsel | Sept. 29, 1953 |
| 2,731,534 | Hansen et al. | Jan. 17, 1956 |
| 2,856,233 | Boyce et al. | Oct. 14, 1958 |

FOREIGN PATENTS

| | | |
|---|---|---|
| 3,188 | Germany | July 26, 1877 |